(12) United States Patent
Swoish et al.

(10) Patent No.: US 9,441,525 B2
(45) Date of Patent: Sep. 13, 2016

(54) METHOD AND APPARATUS TO CONTROL REGENERATION OF A PARTICULATE FILTER

(71) Applicant: GM GLOBAL TECHNOLOGY OPERATIONS LLC, Detroit, MI (US)

(72) Inventors: Christopher C. Swoish, Lapeer, MI (US); Douglas Christopher Sarsen, Howell, MI (US); Christopher Whitt, Howell, MI (US); Thomas Larose, Jr., Howell, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/701,823

(22) Filed: May 1, 2015

(65) Prior Publication Data

US 2015/0233277 A1    Aug. 20, 2015

Related U.S. Application Data

(62) Division of application No. 13/534,230, filed on Jun. 27, 2012, now Pat. No. 9,051,889.

(51) Int. Cl.

| F01N 3/00 | (2006.01) |
|---|---|
| F01N 3/02 | (2006.01) |
| F01N 3/10 | (2006.01) |
| F01N 3/20 | (2006.01) |
| F01N 9/00 | (2006.01) |
| F01N 3/021 | (2006.01) |
| F02D 41/02 | (2006.01) |
| F02D 41/00 | (2006.01) |

(52) U.S. Cl.
CPC ............... *F01N 9/002* (2013.01); *F01N 3/021* (2013.01); *F01N 9/005* (2013.01); *F02D 41/0007* (2013.01); *F02D 41/029* (2013.01); *F01N 2900/0601* (2013.01); *F01N 2900/08* (2013.01); *F01N 2900/14* (2013.01); *Y02T 10/144* (2013.01); *Y02T 10/47* (2013.01)

(58) Field of Classification Search
CPC ........ F01N 3/021; F01N 9/002; F01N 9/005; F01N 2900/0601; F01N 2900/08; F01N 2900/14; Y02T 10/47; Y02T 10/144; F02D 41/029; F02D 41/0007
USPC .................................. 60/286, 295, 297, 311
See application file for complete search history.

(56) References Cited

U.S. PATENT DOCUMENTS

| 6,397,587 B1* | 6/2002 | van Nieuwstadt ...... F01N 9/002 60/274 |
|---|---|---|
| 6,651,638 B1* | 11/2003 | Oakes ..................... F01N 9/002 123/676 |
| 2011/0072803 A1 | 3/2011 | Van Nieuwstadt |
| 2011/0162620 A1* | 7/2011 | Bidner ................ F02D 41/0025 123/299 |

* cited by examiner

*Primary Examiner* — Audrey K Bradley
*Assistant Examiner* — Dapinder Singh

(57) ABSTRACT

An internal combustion engine is fluidly coupled to an exhaust aftertreatment system including a particulate filter. A method for operating the internal combustion engine includes determining an expected boost pressure of an intake air compressor system in response to an output torque request, determining a deviation between an actual boost pressure and the expected boost pressure, determining a engine-out soot generation rate correction based upon the deviation between the actual boost pressure and the expected boost pressure, adjusting a steady-state engine-out soot generation rate using the engine-out soot generation rate correction, time-integrating the adjusted steady-state engine-out soot generation rate, and commanding regeneration of the particulate filter when the time-integrated adjusted engine-out soot generation rate exceeds a predetermined threshold.

7 Claims, 3 Drawing Sheets

METHOD AND APPARATUS TO CONTROL REGENERATION OF A PARTICULATE FILTER

CROSS REFERENCE TO RELATED APPLICATIONS

This application is a divisional application of U.S. application Ser. No. 13/534,230 filed on Jun. 27, 2012, which is incorporated herein by reference.

TECHNICAL FIELD

This disclosure is related to internal combustion engines and aftertreatment systems including particulate filters.

BACKGROUND

The statements in this section merely provide background information related to the present disclosure. Accordingly, such statements are not intended to constitute an admission of prior art.

Known internal combustion engines may be configured to operate with compression-ignition (CI) combustion, and are often referred to as diesel or CI engines. Known products of fuel combustion in CI engines include soot or particulate matter. Particulate filters serve as mechanical filtering devices that remove particulate matter from the exhaust gas feedstream. Particulate filters require regeneration when saturated with particulate matter. Particulate filter regeneration may include consuming fuel to increase temperature in the particulate filter to oxidize the particulate matter, which increases fuel consumption without corresponding tractive effort or vehicle propulsion.

Known systems use engine operating inputs including engine speed, engine fuel consumption (load), and barometric corrections to the air intake system to estimate engine soot production. Known methods to estimate engine soot production incompletely account for increases in soot rates occurring during transient driving maneuvers. Engine soot production during transient driving maneuvers can vary significantly from engine soot production during non-transient driving maneuvers. Calibration efforts associated with estimating engine soot production over a range of engine speed, fueling and intake air pressure conditions and a range of engine fuel/air ratios can be extensive.

SUMMARY

An internal combustion engine is fluidly coupled to an exhaust aftertreatment system including a particulate filter. A method for operating the internal combustion engine includes determining an expected boost pressure of an intake air compressor system in response to an output torque request, determining a deviation between an actual boost pressure and the expected boost pressure, determining a engine-out soot generation rate correction based upon the deviation between the actual boost pressure and the expected boost pressure, adjusting a steady-state engine-out soot generation rate using the engine-out soot generation rate correction, time-integrating the adjusted steady-state engine-out soot generation rate, and commanding regeneration of the particulate filter when the time-integrated adjusted engine-out soot generation rate exceeds a predetermined threshold.

BRIEF DESCRIPTION OF THE DRAWINGS

One or more embodiments will now be described, by way of example, with reference to the accompanying drawings, in which.

DETAILED DESCRIPTION

Figure 1:
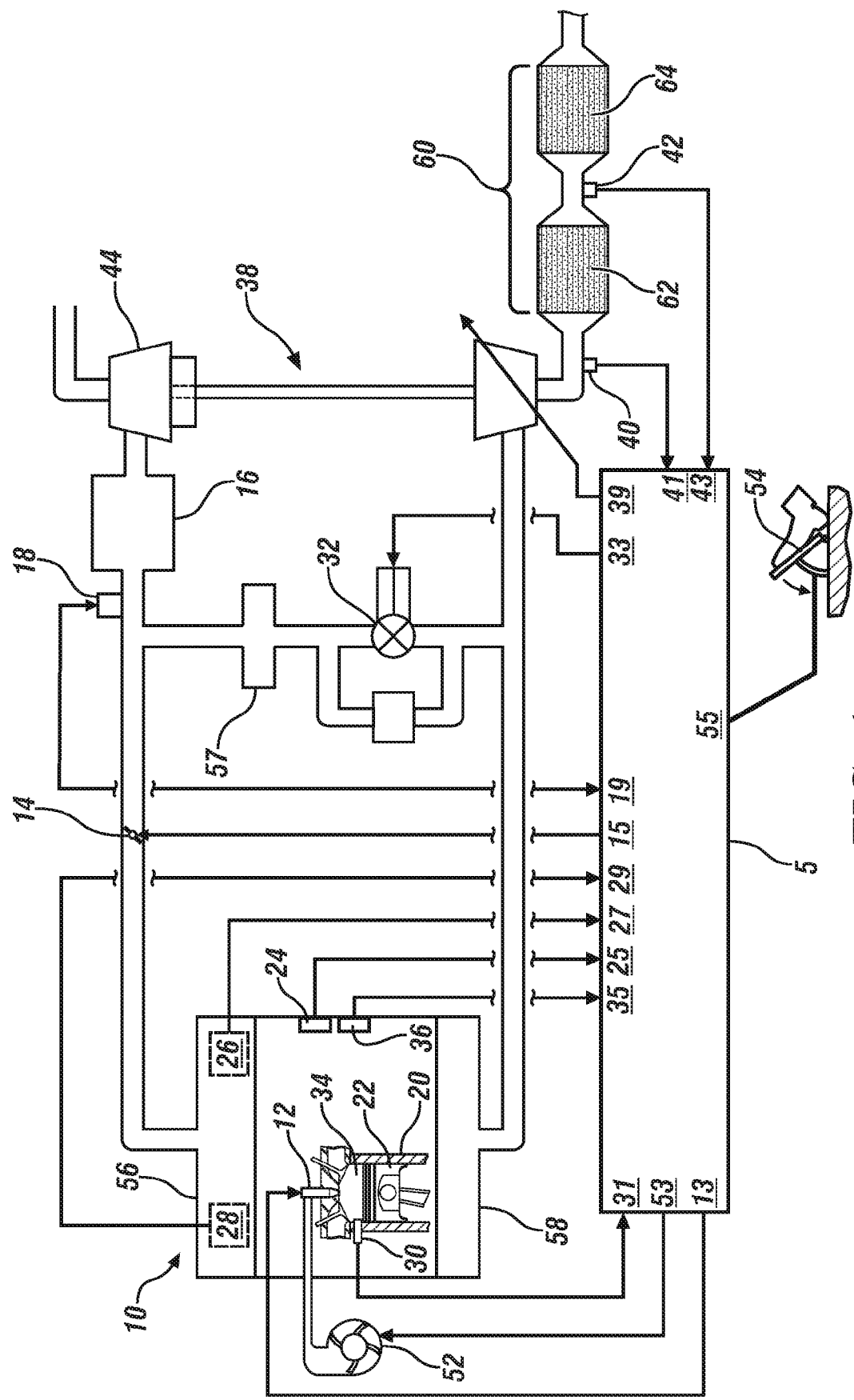
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 60. The exemplary engine 10 is a multi-cylinder, direct-injection, compression-ignition (CI) internal combustion engine including an intake manifold 56 and an exhaust manifold 58, and having reciprocating pistons 22 attached to a crankshaft and movable in cylinders 20 which define variable volume combustion chambers 34. The crankshaft may be attached to a vehicle transmission and driveline to deliver tractive torque thereto in response to an output torque request. The CI engine 10 preferably employs a four-stroke operation wherein each engine combustion cycle includes 720° of angular rotation of the crankshaft divided into four 180° stages of reciprocating movement of the piston 22 in the engine cylinder 20. Each variable volume combustion chamber 34 is defined between the piston 22, the cylinder 20, and a cylinder head as the piston 22 translates in the cylinder 20 between top-dead-center and bottom-dead-center points. The cylinder head includes intake valves and exhaust valves. The CI engine 10 preferably operates in a four-stroke combustion cycle that includes intake, compression, expansion, and exhaust strokes. It is appreciated that the concepts described herein apply to other combustion cycles. The CI engine 10 preferably operates at a lean air/fuel ratio. The exhaust aftertreatment system 60 fluidly couples to the exhaust manifold 58, and preferably includes an oxidation catalyst 62 fluidly upstream of a particulate filter 64. The particulate filter 64 may be catalyzed. The exhaust aftertreatment system 60 may include other components and sensors. The disclosure is applicable to other engine configurations that operate at lean conditions and generate particulate matter, including lean-burn spark-ignition engines. The disclosure is applicable to powertrain systems that employ internal combustion engines in combination with transmission devices to generate tractive torque, including by way of example engine-transmission systems and hybrid powertrain systems employing non-combustion torque generative motors.

The engine 10 includes sensors to monitor engine operation and actuators which control engine operation. The sensors and actuators are signally and operatively connected to control module 5. The actuators are installed on the engine 10 and controlled by the control module 5 in response to operator inputs to achieve various performance goals. A fuel injection system including a plurality of direct-injection fuel injectors 12 is fluidly coupled either directly or via a common-rail fuel distribution system to a pressurized fuel distribution system including a high-pressure fuel pump 52. The fuel pump 52 may be controlled to control fuel pressure 53. The fuel injectors 12 directly inject fuel into each of the combustion chambers 34 to form a cylinder charge in response to an injector control signal 13 from the control module 5. The fuel injectors 12 are individually supplied with pressurized fuel, and have operating parameters including a minimum pulsewidth and an associated minimum controllable fuel flow rate, and a maximum fuel flow rate. An exhaust gas recirculation (EGR) system includes a flow channel for directing flow of externally recirculated exhaust gas between the exhaust manifold 58 and the intake manifold 56, an intercooler 57 and an EGR valve 32 that is controlled via control signal 33 from the control module 5. An intake air compressor system 38 is configured to control flow of intake air to the engine 10 in response to a compressor boost command 39. The intake air compressor system 38 boosts a supply of intake air into the engine 10 to increase engine mass airflow and thus increase engine power, including increasing intake air pressure to greater than ambient pressure levels. In one embodiment the intake air compressor system 38 is a variable-geometry turbocharger (VGT) system that includes a turbine device located in the exhaust gas stream rotatably coupled to an intake air compressor 44 that is configured to increase flow of engine intake air. Alternatively, the intake air compressor system 38 may include a supercharger device or another turbocharger device. An air intercooler device 16 may be fluidly located between the intake air compressor 44 and the engine intake manifold 56. An electronically-controlled throttle valve 14 controls throttle opening and thus flow of intake air into the intake system of the engine in response to a throttle control signal (ETC) 15. A glow-plug may be installed in each of the combustion chambers 34 for increasing in-cylinder temperature during engine starting events at cold ambient temperatures. The engine 10 may be equipped with a controllable valvetrain configured to adjust openings and closings of intake and exhaust valves of each of the cylinders, including any one or more of valve timing, phasing (i.e., timing relative to crank angle and piston position), and magnitude of lift of valve openings.

The sensors described herein are configured to monitor physical characteristics and generate signals that correlate to engine, exhaust gas, and ambient parameters. A crank sensor 24 interacts with a multi-tooth target wheel attached to the crankshaft to monitor engine crank position and engine speed (RPM) 25. A combustion pressure sensor 30 is configured to monitor cylinder pressure 31, from which a mean-effective pressure or another suitable combustion parameter may be determined. The combustion pressure sensor 30 may be non-intrusive, including a force transducer having an annular cross-section that is installed into the cylinder head at an opening for a glow-plug and having an output signal that is proportional to cylinder pressure. The pressure sensor 30 includes a piezo-ceramic or other suitable monitoring device. A mass air flow (MAF) sensor 18 monitors mass air flow 19 of fresh intake air. A coolant sensor 36 monitors engine coolant temperature 35. A manifold absolute pressure (MAP) sensor 26 monitors intake manifold absolute pressure 27 and ambient barometric pressure. Preferably the MAP sensor 26 is configured to monitor positive and negative pressures, and is thus able to monitor boost pressure in the intake manifold 56. A manifold air temperature (MAT) sensor 28 monitors intake manifold air temperature 29. Exhaust gas sensors 40 and 42 monitor states 41 and 43 respectively, of one or more exhaust gas parameters, e.g., air/fuel ratio, and exhaust gas constituents, and may be used as feedback for control and diagnostics. Other sensors and monitoring schemes may be employed for purposes of control and diagnostics. Operator input in the form of an output torque request 55 may be obtained through an operator interface system 54 that preferably includes an accelerator pedal and a brake pedal, among other devices. Each of the aforementioned sensors is signally connected to the control module 5 to provide signal information which is transformed to information representative of the respective monitored parameter. It is understood that this configuration is illustrative and not restrictive, including the various sensors being replaceable with functionally equivalent devices and routines.

The control module 5 executes routines stored therein to control the aforementioned actuators to control engine operation, including throttle position, fuel injection mass and timing, EGR valve position to control flow of recirculated exhaust gases, compressor boost, glow-plug operation, and control of intake and/or exhaust valve timing, phasing, and lift on systems so equipped. The control module 5 is configured to receive the operator inputs 54 to determine the output torque request 55 and receive signal inputs from the aforementioned sensors to monitor engine operation and ambient conditions. The engine 10 is configured to generate output torque in response to the output torque request 55, including operating over a broad range of temperatures, cylinder charge (air, fuel, and EGR) and injection events.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module 5 has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

Figure 2:
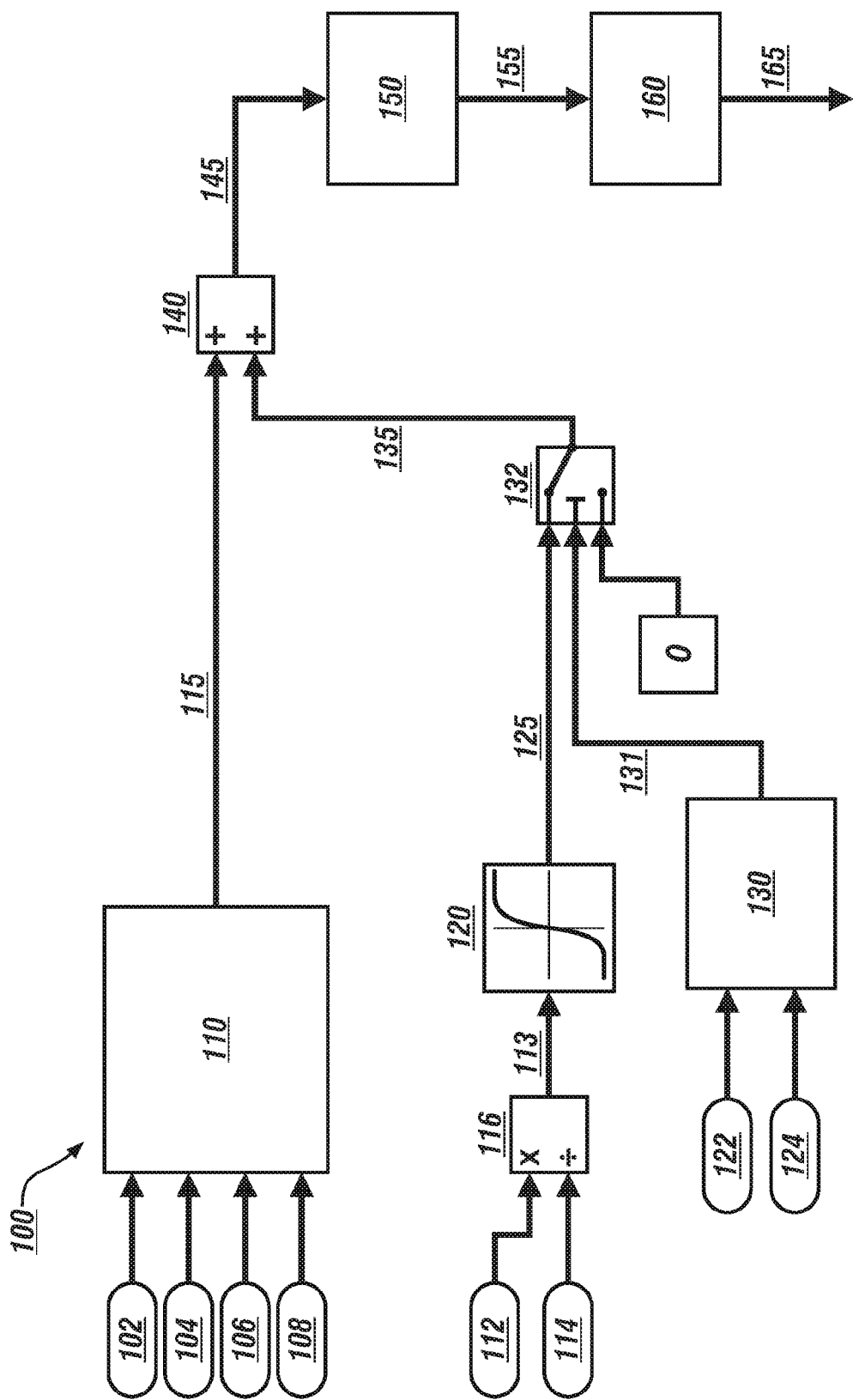
FIG. 2 illustrates a control scheme for controlling regeneration of a particulate filter that includes adjusting an engine-out soot rate estimation in response to a transient change in boost pressure from the intake air compressor system, in accordance with the disclosure.

FIG. 2 schematically shows a control scheme 100 for controlling regeneration of a particulate filter, described with reference to the CI engine 10 of FIG. 1. The control scheme 100 includes adjusting a steady-state engine-out soot generation rate in response to a transient change in boost pressure from the intake air compressor system. The control scheme 100 is periodically executed during ongoing engine operation, with the adjusted engine-out soot generation rate estimated and integrated over time. Regeneration of the particulate filter is controlled in response to the time-integrated adjusted engine-out soot generation rate.

Engine operating parameters including engine speed 102, an engine load 104, e.g., as indicated by a fueling rate, and a barometric pressure correction 106 are employed to determine an engine operating point. A soot estimation model 110 determines a steady-state engine-out soot generation rate 115 (in mg/sec) based upon the engine operating point, including taking into consideration factors related to EGR flowrate, an engine operating mode, exhaust gas temperature, operation of the intake air compressor system, and the output torque request for the present engine operating conditions.

The soot estimation model 110 includes calibration maps that output a steady-state engine-out soot generation rate based upon the aforementioned factors including the engine operating point. The calibration maps are predetermined under steady-state engine operating conditions. The engine operating mode, barometric pressure correction 106, and EGR rate inputs are used to select a specific calibration map or combination of calibration maps, and the selected specific calibration map(s), are used to determine the steady-state engine-out soot generation rate for the engine operating point. This may include subtracting a DPF-burned soot rate 108 from the steady-state engine-out soot generation rate at the specific engine operating point. The soot estimation model 110 is calibrated to provide an accurate estimation of the soot rate for a steady-state driving condition. Engine-out soot generation rate are known to fluctuate during transient driving maneuvers, and thus an estimation of the soot rate may be inaccurate during a transient driving maneuver due to latencies that are the result of electrical, mechanical and pneumatic response times associated with the components of the intake air compressor system 38 and the engine 10 that introduce response time lags. By way of example, engine operation associated with a highway cruise at X RPM, Y fueling has a steady-state engine-out soot generation rate of Z mg/s. However, an engine acceleration from a idle/stop with the engine operating point that crosses through the X RPM, Y fueling operating point as it accelerates and may have an engine out soot rate that is 3*Z mg/s due in large part to deviation in the boost pressure in reference to the desired boost pressure at the specific operating point. This may be the result of lag in the intake air compressor system 38, which results in the boost pressure being lower under acceleration through an engine operating point than engine operation that is stabilized at the same engine operating point in a steady-state driving condition.

Coincidently, an actual boost pressure 114 generated by the intake air compressor system 38 is monitored, which preferably includes employing the MAP sensor 26 to monitor the manifold absolute pressure 27. The actual boost pressure 114 is the pressure in the intake manifold 56, and indicates pressure and thus intake airflow generated by the intake air compressor system 38. A boost pressure deviation 112 is a difference between the actual boost pressure and an expected boost pressure that is determined based upon the output torque request. The actual boost pressure 114 may differ from the expected boost pressure under transient operating conditions due to latencies that are the result of electrical, mechanical and pneumatic response times associated with the components of the intake air compressor system 38 and the engine 10. A calculation scheme 116 calculates a normalized boost pressure deviation 113, which may be calculated as a ratio of the boost pressure deviation 112 and the actual boost pressure 114. The normalized boost pressure deviation 113 is employed in a soot generation correction model 120 to determine an engine-out soot generation rate correction (mg/sec) 125 for the present engine operating conditions, which is input to a selector 132. The soot generation correction model 120 is preferably a precalibrated scheme in vector form that provides the engine-out soot generation rate correction 125 in response to the normalized boost pressure deviation 113, taking into account factors that affect the soot generation, and preferably employed during a closed-loop boost control operation.

Coincidently, a commanded boost control state 122, i.e., the commanded state of a control scheme for determining the compressor boost command 39 is determined. The commanded boost control state 122 may be one of an open-loop control state and closed-loop control state, with the open-loop control state preferably employed during low speed and low load engine operating conditions and the closed-loop control state preferably employed during high speed and high load engine operating conditions.

An actual boost control state 124 is also monitored, indicating the actual operation of the boost control in one of the closed-loop and open-loop control states, irrespective of the commanded boost control state 122. Control module 130 uses the commanded boost control state 122 and the actual boost control state 124 to determine whether to employ the engine-out soot generation rate correction 125. Preferably the engine-out soot generation rate correction 125 is employed only when operating with closed-loop boost control, because a deviation from the closed-loop control likely means that the transient engine-out soot generation rate will be different than the steady-state engine-out soot generation rate. The control module 130 generates a discrete output 131 of either HIGH or LOW, which is used to control the selector 132. When the discrete output 131 is HIGH, the engine-out soot generation rate correction 125 is selected as the output 135 from the selector 132 and combined 140 with the steady-state soot generation rate 115 to determine a total engine-out soot generation rate 145. When the discrete output 131 is LOW, an engine-out soot generation rate correction of zero (0) is selected as the output 135 from the selector 132 and combined 140 with the steady-state engine-out soot generation rate 115. In this condition, the total engine-out soot generation rate 145 is equal to the steady-state engine-out soot generation rate 115.

The total engine-out soot generation rate 145 is integrated over time using an integrator 150 to determine a soot mass (mg) 155. A regeneration scheme 160 compares the soot mass 155 with a threshold or maximum soot mass, and makes a decision 165 to regenerate the particulate filter when the soot mass 155 exceeds the threshold soot mass. This decision 165 to regenerate the particulate filter is provided to another engine control module for execution.

Thus, the control scheme 100 provides a correction to the soot estimation model 110 during transient driving conditions that are caused by boost deviations by normalizing the deviation and applying an engine-out soot generation rate correction to the steady-state engine-out soot generation rate. The control scheme 100 thus improves accuracy of engine-out soot generation rate estimation during transient cycles where soot rates are increased due to boost deviation, increasing reliability of a decision to execute particulate filter regeneration.

Figure 3:
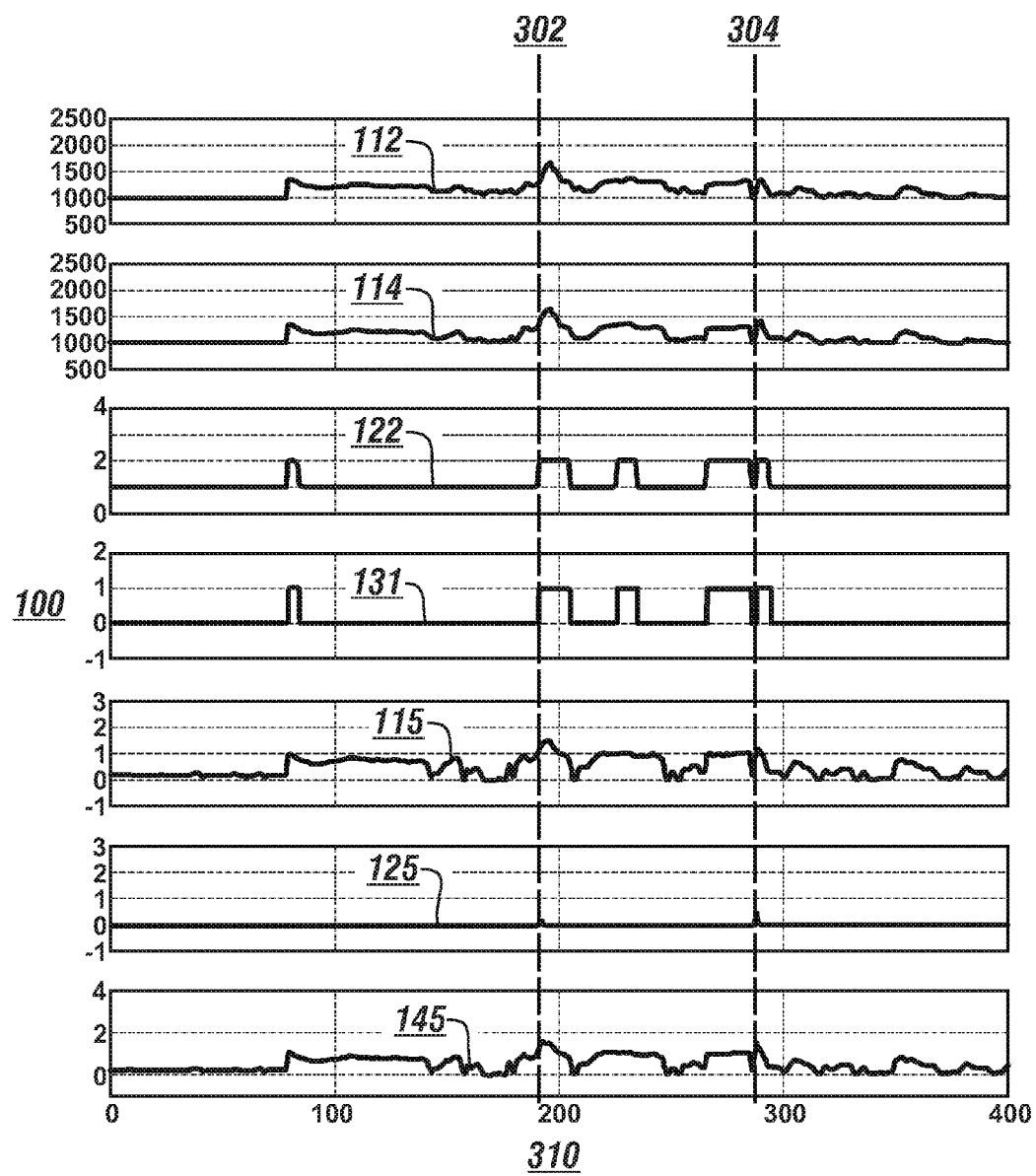
FIG. 3 illustrates data associated with operation of the control scheme for controlling regeneration of the particulate filter described with reference to FIG. 2, in accordance with the disclosure.

FIG. 3 graphically shows data associated with operation of an exemplary internal combustion engine employing the control scheme 100 shown with reference to FIG. 2. Depicted data includes the actual boost pressure 112, the expected boost pressure 114, the commanded boost control state 122, the discrete output 131 of control module 130, the steady-state engine-out soot generation rate 115, the engine-out soot generation rate correction 125 and the total engine-out soot generation rate 145, all shown coincidently in relation to time 310. At time points 302 and 304 the conditions set forth with reference to FIG. 2 are such that the soot generation correction 125 is added to the steady-state soot generation rate 115, which is used to determine the total engine-out soot generation rate 145. As previously described, the total engine-out soot generation rate 145 is integrated over time using an integrator to determine a soot mass (gm), which is employed to make a decision whether to regenerate the particulate filter.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine fluidly coupled to exhaust aftertreatment system including a particulate filter, comprising:
   determining an expected boost pressure of an intake air compressor system in response to an output torque request;
   determining a deviation between an actual boost pressure and the expected boost pressure;
   determining a engine-out soot generation rate correction based upon the deviation between the actual boost pressure and the expected boost pressure;
   adjusting a steady-state engine-out soot generation rate using the engine-out soot generation rate correction;
   time-integrating the adjusted steady-state engine-out soot generation rate; and
   regenerating the particulate filter when the time-integrated adjusted engine-out soot generation rate exceeds a predetermined threshold.

2. The method of claim 1, wherein adjusting the steady-state engine-out soot generation rate comprises:
   identifying a boost control state comprising one of an open-loop control state and closed-loop control state; and
   adjusting the steady-state engine-out soot generation rate using the engine-out soot generation rate correction when the identified boost control state comprises the closed-loop control state.

3. A method for operating an internal combustion engine including an intake air compressor system and fluidly coupled to an exhaust aftertreatment system including a particulate filter, comprising:
   determining a total engine-out soot generation based upon a summation of a steady-state engine-out soot generation rate and an engine-out soot generation rate correction that is one of zero when said intake air compressor system is closed-loop controlled and a rate based upon a deviation between an actual boost pressure and an expected boost pressure from the intake air compressor system;
   regenerating the particulate filter when the total engine-out soot generation exceeds a predetermined threshold.

4. The method of claim 3 wherein said steady-state engine-out soot generation rate is determined based upon an engine operating point comprising engine speed and load.

5. The method of claim 3 wherein said total engine-out soot generation is determined through an integration of said summation of the steady-state engine-out soot generation rate and the engine-out soot generation rate correction.

6. The method of claim 5 wherein said steady-state engine-out soot generation rate is determined based upon an engine operating point comprising engine speed and load.

7. The method of claim 6 wherein said steady-state engine-out soot generation rate is further determined based upon a barometric pressure correction.

* * * * *